3,606,867
PULSATING COMBUSTION SYSTEM
Francis E. J. Briffa, Sunningdale, England, assignor to Shell Oil Company, New York, N.Y.
Filed Mar. 5, 1970, Ser. No. 16,799
Claims priority, application Great Britain, Feb. 17, 1969, 8,442/69
Int. Cl. F23r 1/12
U.S. Cl. 122—24
3 Claims

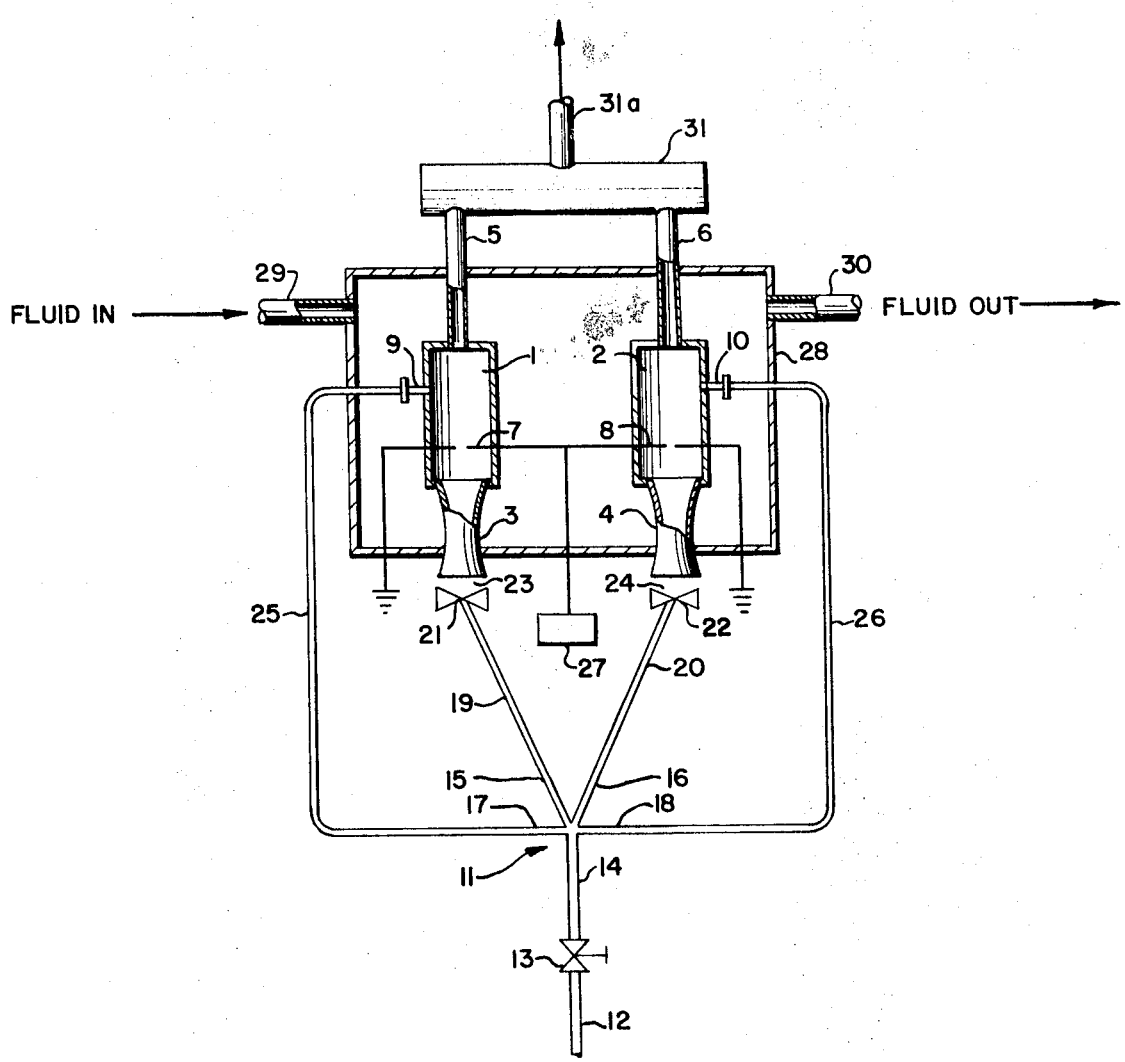

ABSTRACT OF THE DISCLOSURE

A pulsating combustion system for producing a high temperature, high pressure gas stream including at least a pair of combustion chambers with each of the chambers having at least one inlet for introducing a mixture of gas and oxidant thereto and at least one combustion gas outlet. Ignition means are associated with the interior of each of the chambers for igniting the mixture of gas and oxidant present in the chambers and pulse take-off means are coupled to each of the chamber means for taking pressure pulses due to combustion in the chambers from each of the chambers. Finally, gas feed means are coupled to each of the inlets for selectively supplying gas thereto with switching means operatively engaging both the gas feed means and the pulse take-off means for supplying gas to the inlet of one of the chambers upon actuation of the pressure pulses received by the pulse take-off means from the other of the chambers.

BACKGROUND OF THE INVENTION

Field of the invention

The present invention relates to pulsating combustion systems.

Description of the prior art

Many advantages may be gained from the use of pulsating combustion systems in heat transfer applications.

The combustion intensity is high because the process approximates to constant volume combustion, and hence for a given heat output the combustion chamber is relatively small.

Because the combustion gases are intermittently produced the boundary layer resistance to heat transfer is reduced. Thus the heat exchange surfaces may be correspondingly smaller for a specific plant output. Alternatively, high rates of heating can be achieved.

It is possible to control the maximum gas temperature by use of a secondary injector, so that dangers of overheating surfaces can be minimized.

The pressure generated in the combustion chamber enables the exhaust gases to be readily cleared; for this reason, narrow bore stacks can be used.

At present, however, pulsating combustors are not widely employed either industrially or for domestic purposes because of the unsatisfactory performance of the mechanical or aerodynamic valves employed for regulating the intermittent flow into the combustors. Mechanical valves are often very noisy and develop a preferential deformation under prolonged usage leading to reduced efficiency and failure, whilst aerodynamic valves have been found unsatisfactory because of the backflow of exhaust products through the inlet. Furthermore, turndown ratios are restricted.

SUMMARY OF THE INVENTION

The present invention provides a pulsating combustor which does not need mechanical valves and whose operating frequency range is not only dependent on its natural resonant frequency. Further, it has a wide-turn ratio and only a small fan is required at start-up for supplying the starting air.

According to the invention, a pulsating combustion system comprises at least two combustion spaces each provided with an inlet for a fuel oxidant mixture, an outlet for combustion gases, ignition means and a pulse take-off means, each pulse take-off means being connected to a control channel of a fluid logic device acting as a fluidic multiple way valve, each outlet thereof being in communication with the inlet of a combustion space.

The ignition means may comprise a stabilizer/ignitor arranged within each combustion space and connected to a high tension electricity source. Preferably, the fuel inlet of each combustion space comprises a gas nozzle or nozzles including air inlet ejector means.

Each combustion space may include a mantle or reservoir adapted for circulating a fluid to be heated therethrough. The combustion spaces may also include a common fluid mantle or reservoir and the outlets of the combustion spaces may be provided with silencing means.

BRIEF DESCRIPTION OF THE DRAWING

The drawing is a vertical sectional view, partly schematic, showing a pulsating combustion system in accordance with my invention.

DESCRIPTION OF THE PREFERRED EMBODIMENTS

Referring to the drawing, a pulsating combustion system is shown having at least a pair of combustion chambers 1 and 2 provided with inlets 3 and 4 and outlets 5 and 6, respectively. Each combustion chamber contains an ignitor/stabilizer 7, 8 and a pulse take-off connection 9, 10.

In the present example, a fluid logic circuit 11 is connected to a gas feed line 12 provided with control valve 13. The fluid logic circuit contains a plurality of channels, one channel 14 being the inlet channel which is connected with the gas feed line; channel 14 separates into two outlet channels 15 and 16. At the point where channel 14 separates into two other channels, there also laterally debouch opposite each other, two switching channels 17 and 18. It should be noted that the construction of fluid logic devices, their application as fluidic valves, as well as the way of operation therewith, are well known in the art. Channels 15 and 16 are connected with feed lines 19 and 20, respectively, these lines in turn feeding gas ejectors 21 and 22. During operation, oxidant is sucked in through inlets 23 and 24.

Connecting lines 25 and 26 connect pulse take-offs 9 and 10 with switching channels 17 and 18 respectively. Ignition means 7 and 8 are connected with a high frequency electricity source 27. The combustion chambers are surrounded by a heating mantle 28, in this example, a reservoir, adapted for receiving a fluid, such as water, through inlet 29, the heated fluid leaving the mantle through outlet 30, which may, for instance, be connected to a central heating circuit (not shown). Finally, the combustion gas outlets 5 and 6 are connected to a common duct 31 acting as a silencer and having a common gas outlet 31a.

In operation, a gas jet emerging from one of the outlet channels (e.g. 15) of the fluid logic circuit 11 at a certain moment is injected into a combustion chamber 1 where the fuel and entrained oxidant mixture is ignited by ignition means 7. The pressure pulse due to combustion in the chamber is then piped from the pulse take-off 9 through line 25 to switching channel 17 and the pulse from this channel causes the main jet to switch over from one exit 15 to the other 16. The half cycle described is then repeated with the second chamber 2 so that combustion occurs alternately.

The frequency of pulsation is determined by the rate of fuel supply, the fuel oxidant mixture and by the delay in switching, while the pressure rise within the combustor is determined by combustion chamber design.

No resonance is required and frequency of pulsation can be easily controlled. The system has no mechanical valves and thus no moving parts. No intermittent source of gas is required. No forced air supply is needed and a fan is not required at start up. The energy involved in maintaining pulsation is only a fraction of the energy released by the combustion pressure wave.

Furthermore, the combustors are operated out of phase which may be used to advantage in decreasing the noise level caused by the combustor.

In case a liquid fuel is used, the oxidant may be employed as the leading fluid ensuring the switching sequence from one combustion chamber to the other, in which case the oxidant is led through the fluid logic circuit, the fuel then being supplied by means of a carburetting device or the like.

In particular applications, such as e.g. when the effluent gases are used as a rapid heating gas stream impinging on objects for heat treatment, if desired the flow of both fluids, fuel as well as oxidant, can be governed by a fluid logic circuit.

Furthermore, the system can be adapted to the provision of more than two combustion chambers, in which a multiple governing fluid logic circuit is to be employed, e.g. by arranging more fluid logic circuits in series, each being suitably connected with a pulse take-off line and accurately timed.

As each pressure rise in a combustion chamber is followed by a vacuum causing a negative pulse, in systems wherein this negative pulse is dominating, provisions are to be made for neutralizing the influence thereof. As an alternative, the pulse take-off connections may be interchanged.

I claim as my invention:

1. A pulsating combustion system for producing a high temperature, high pressure gas stream comprising:
   at least a pair of combustion chambers, each of said chambers having at least one inlet for introducing a mixture of gas and oxidant thereto and at least one combustion gas outlet;
   ignition means associated with the interior of each of said chambers for igniting the mixture of gas and oxidant present in said chambers;
   pulse take-off means coupled to each of said chamber means for taking pressure pulses due to combustion in said chambers from each of said chambers;
   gas feed means coupled to each of said inlets for selectively supplying gas thereto; and
   switching means operatively engaging both said gas feed means and said pulse take-off means for supplying gas to the inlet of one of said chambers upon actuation of the pressure pulses received by said pulse take-off means from the other of said chambers.

2. The system of claim 1 including silencing means coupled to the outlets of each of said chambers for silencing the result of combustion in said chambers.

3. The system of claim 1 including a heating mantle surrounding all of said chambers having a fluid inlet and a fluid outlet associated therewith.

References Cited

UNITED STATES PATENTS

| | | | |
|---|---|---|---|
| 2,523,308 | 9/1950 | Kemmer et al. | 60—225 |
| 2,838,102 | 6/1958 | Reimers | 431—1 |
| 3,447,878 | 6/1969 | Haag et al. | 431—1 |

FREDERICK L. MATTESON, Primary Examiner

R. A. DUA, Assistant Examiner

U.S. Cl. X.R.

431—1; 60—39.76